United States Patent [19]

Siler

[11] Patent Number: 4,540,872
[45] Date of Patent: Sep. 10, 1985

[54] APPARATUS FOR ROTATING A GENERALLY CYLINDRICAL HEAVY WORKPIECE FOR TREATMENT

[75] Inventor: G. Daniel Siler, Dayton, Ohio

[73] Assignee: Dayton Machine Tool Company, Dayton, Ohio

[21] Appl. No.: 577,351

[22] Filed: Feb. 6, 1984

[51] Int. Cl.³ .............................................. B23K 9/225
[52] U.S. Cl. .................................. 219/159; 82/38 R; 219/60 R; 219/76.14
[58] Field of Search ................. 219/76.1, 76.14, 76.15, 219/159, 59.1, 60 R; 82/38 R; 269/289 MR

[56] References Cited

U.S. PATENT DOCUMENTS

| | | | |
|---|---|---|---|
| 2,175,607 | 10/1939 | Kinkead | 219/76.15 X |
| 3,918,697 | 11/1975 | Gregory | 269/289 MR |
| 4,052,039 | 10/1977 | Koyano et al. | 219/60 R X |

FOREIGN PATENT DOCUMENTS 2061156  5/1981  United Kingdom ............. 219/76.14

*Primary Examiner*—Roy N. Envall, Jr.
*Assistant Examiner*—Alfred S. Keve
*Attorney, Agent, or Firm*—Jacox & Meckstroth

[57] ABSTRACT

A large generally cylindrical workpiece is supported for rotation and driven by a set of axially spaced floor supported units each including a pair of parallel spaced cradle rolls. The cradle rolls of each unit are supported by a surrounding frame, and a pair of trunnions support each frame and cradle rolls for tilting movement on a transverse axis. Each unit also has a set of power operated screw jacks which precisely position the cradle rolls at a selected elevation, and the cradle rolls of one unit have resilient outer surfaces and are driven by an endless chain drive system. The cradle rolls of another unit are positioned within a cooling liquid to prevent overheating of the rolls by a heated workpiece, and each unit carries air inflatible flotation cells to facilitate moving the unit. A horizontal track extends parallel to the cradle rolls and supports a carriage having a portion projecting cantileveredly above the workpiece. The carriage portion supports a workpiece treating unit or head and automatically adjusts vertically for changes in workpiece diameter. A tailstock unit includes a vertically adjustable horizontal spindle supporting a center tool engaging the end of the workpiece, and a signal generator senses the speed of rotation of the spindle for precisely controlling the movement of the carriage.

20 Claims, 10 Drawing Figures

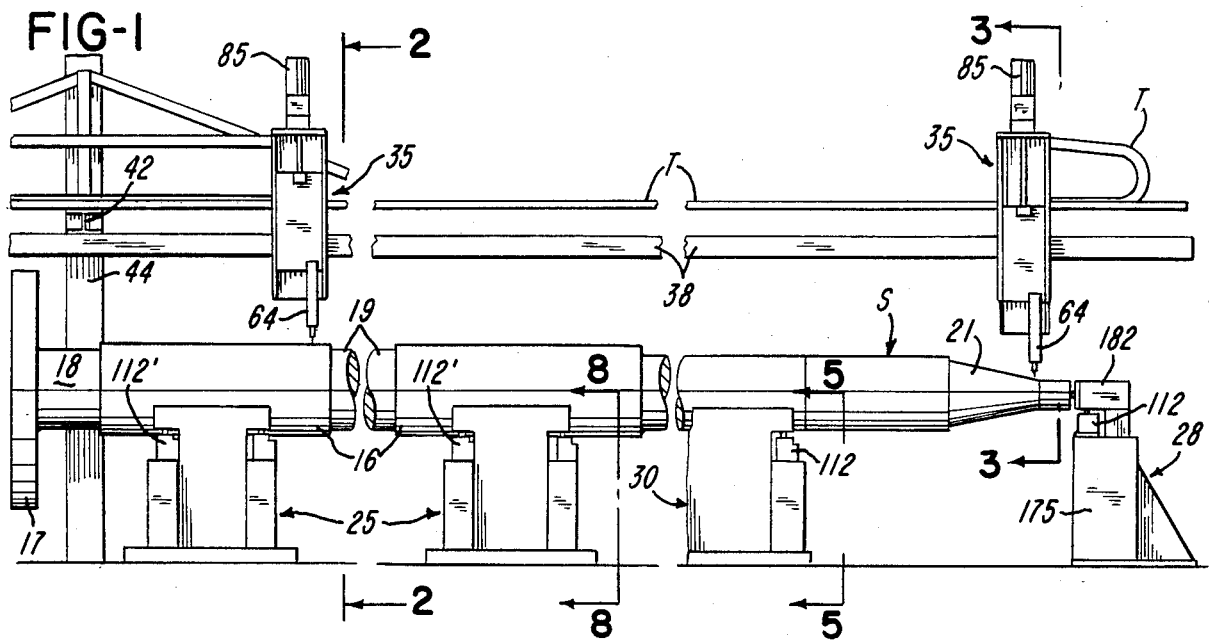
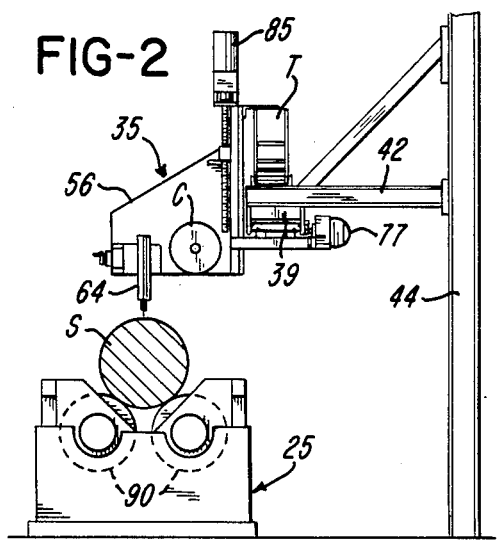
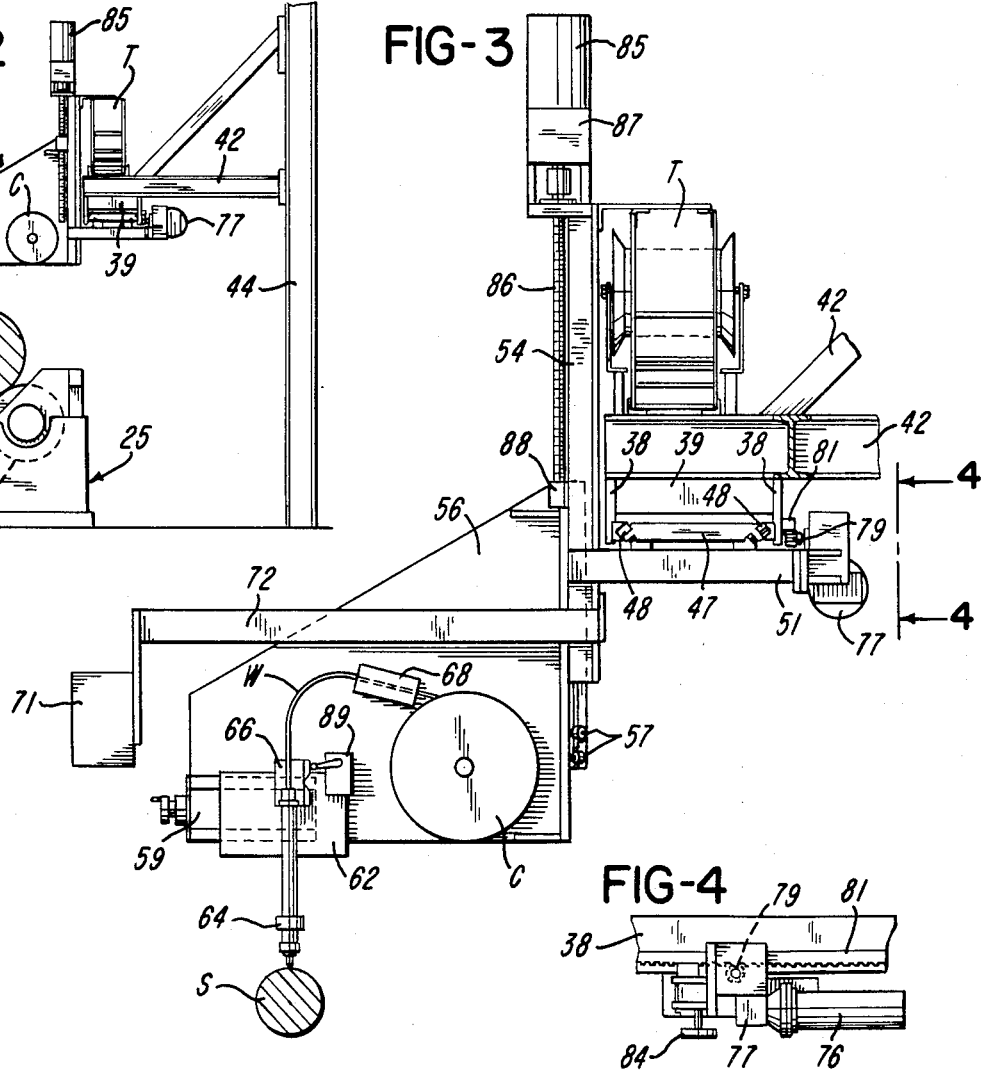

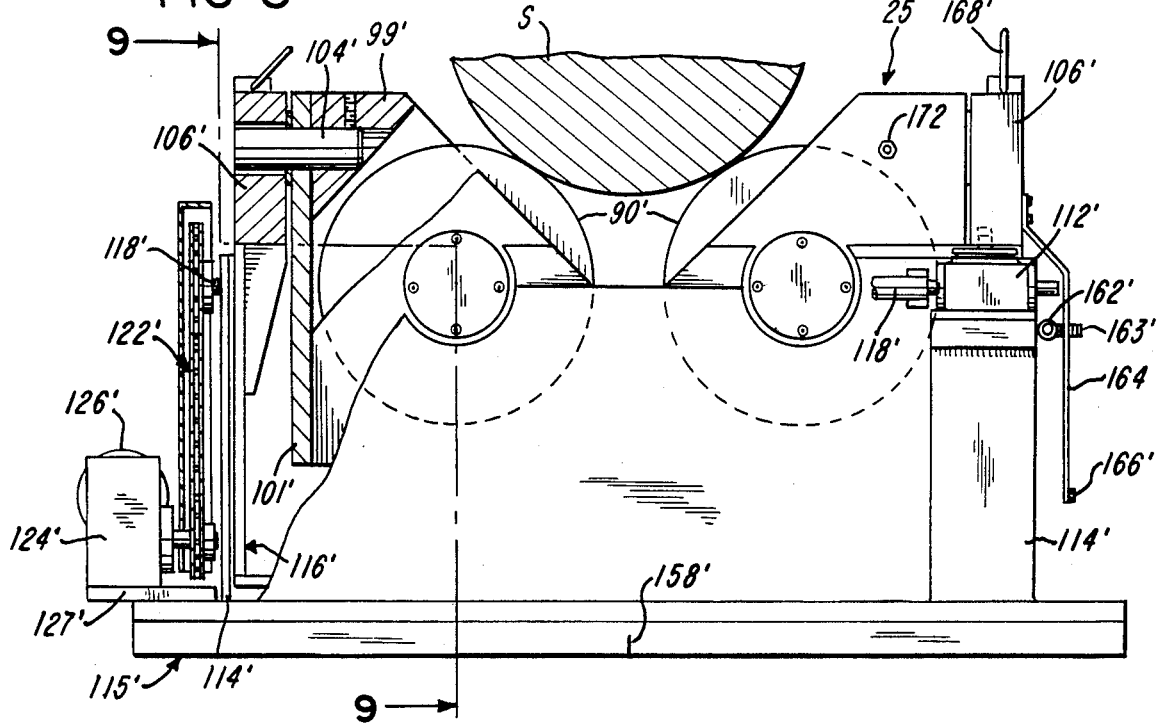
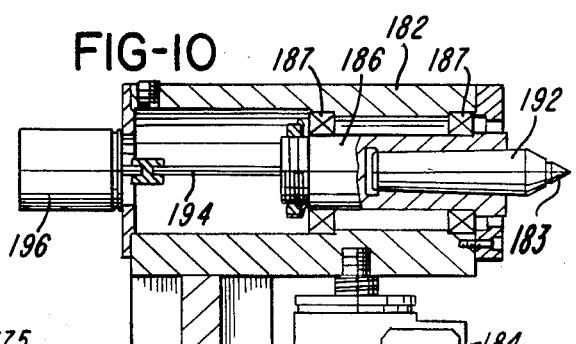
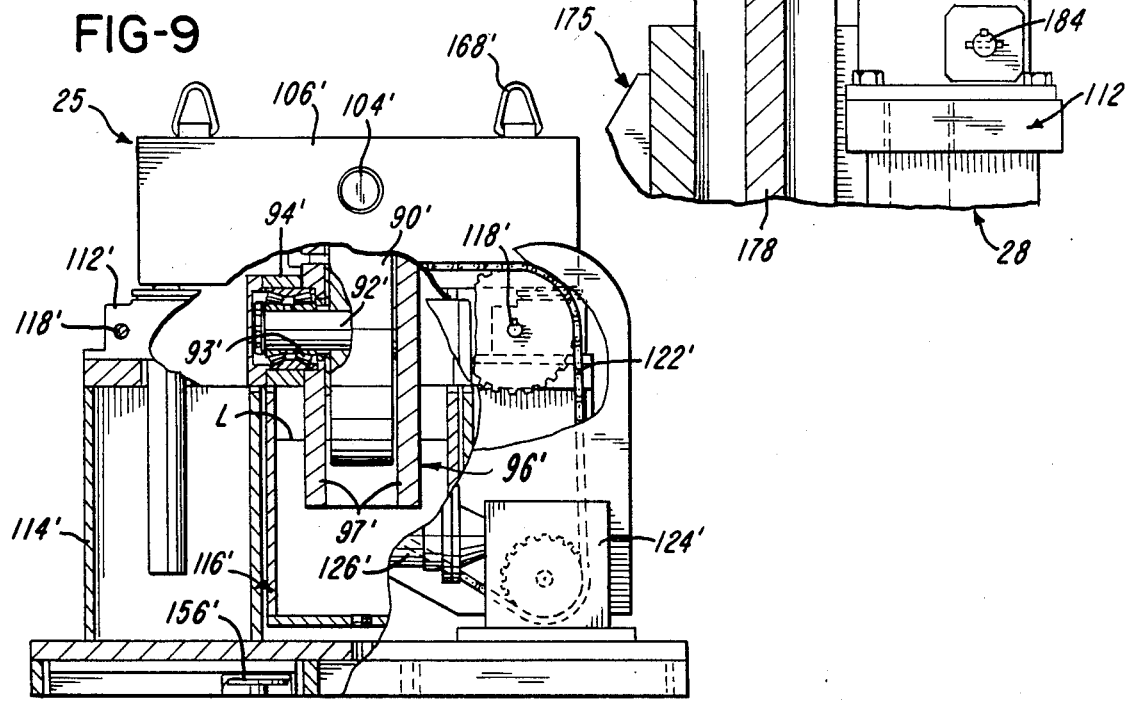

APPARATUS FOR ROTATING A GENERALLY CYLINDRICAL HEAVY WORKPIECE FOR TREATMENT

BACKGROUND OF THE INVENTION

In the machining or grinding or rebuilding of a generally cylindrical heavy metal workpiece such as a large diameter cylinder or shaft, it is common to position the workpiece within a machine tool facility similar to a lathe and having one or more workpiece supports mounted on a long base or bed of the machine tool for rotatably supporting an intermediate portion of the workpiece. The workpiece is usually rotated or driven by a motor driven headstock which grips and supports one end of the workpiece, and the opposite end of the workpiece is engaged by a tailstock also mounted on the bed. When the workpiece or shaft has a substantially large diameter or substantial length, for example, a length over forty or fifty feet, the cost of constructing a machine tool facility with a long bed supporting a power driven headstock, one or more intermediate workpiece supports and a tailstock, becomes exceedingly high, and the facility is not easily modified or adjusted for handling workpieces of different diameters and lengths.

SUMMARY OF THE INVENTION

The present invention is directed to improved apparatus for rotatably supporting and rotating a large diameter and/or long shaft or other generally cylindrical workpiece to provide for performing one or more operations on the workpiece while it is rotating. The invention significantly reduces the cost of constructing the apparatus and provides for conveniently accommodating heavy workpieces of different sizes, weights and lengths. The apparatus of the invention also eliminates the need for a long base or bed member and provides for rotatably supporting and rotating a long and heavy generally cylindrical workpiece by means of a series of independent workpiece support and drive units which are adapted to be conveniently positioned in alignment on a concrete floor surface along with a tailstock unit which engages and positions one end of the workpiece. The apparatus may also incorporate means for treating the outer surface of the workpiece while it is rotating.

The above features and advantages are generally provided in accordance with the invention by a series of floor mounted workpiece support units each of which incorporates a pair of parallel spaced cradle rolls mounted on a frame. The frame of each unit is supported by a pair of trunnions providing for tilting movement of the frame and the cradle rolls on a transverse axis. Each unit also incorporates a set of power operated screw jacks which operate in unison for precisely positioning the cradle rolls at a predetermined elevation, and a set of air inflatable floatation cells provided for conveniently moving each unit along the floor surface and for precisely positioning the units in alignment and predetermined spaced relation. The cradle rolls of one of the workpiece support units have outer layers of resilient material and are driven by a power operated chain drive system supported for tilting movement with the cradle rolls. In another workpiece support unit, the frame and cradle rolls are partially confined within a container which receives a cooling liquid to prevent overheating of the cradle rolls by a heated workpiece.

An elongated track extends parallel to the axis of the workpiece in laterally spaced relation and supports a carriage having a vertically movable portion which projects cantileveredly above the workpiece. The vertically movable carriage portion supports a workpiece treating device such as a welding head which is used for rebuilding the diameter of the workpiece. The longitudinal position of the rotating workpiece is controlled by a tailstock unit which is also adapted to rest on the floor surface and includes a vertically adjustable rotating spindle supporting a center tool element for engaging the end of the workpiece on its axis. A signal generator senses the rotation of the spindle and workpiece and controls the horizontal movement of the carriage on the track.

Other features and advantages of the invention will be apparent from the following description, the accompanying drawings and the appended claims.

BRIEF DESCRIPTION OF THE DRAWINGS

FIG. 1 is a diagrammatic elevational view of apparatus constructed in accordance with the invention and with sections of the apparatus and workpiece broken away;

FIG. 2 is an elevational view of the apparatus taken generally on the line 2—2 of FIG. 1;

FIG. 3 is an enlarged elevational view of the carriage shown in FIG. 2;

FIG. 4 is an elevational view of the carriage drive taken generally on the line 4—4 of FIG. 3;

FIG. 8 is a part elevational view and part section of a workpiece support unit as taken generally on the line 8—8 of FIG. 1;

FIG. 9 is a part elevational view and part section of the workpiece support unit, taken generally on the line 9—9 of FIG. 8; and FIG. 10 is an enlarged vertical section of the upper portion of the tailstock unit shown in FIG. 1.

DESCRIPTION OF THE PREFERRED EMBODIMENT

Figure 5:
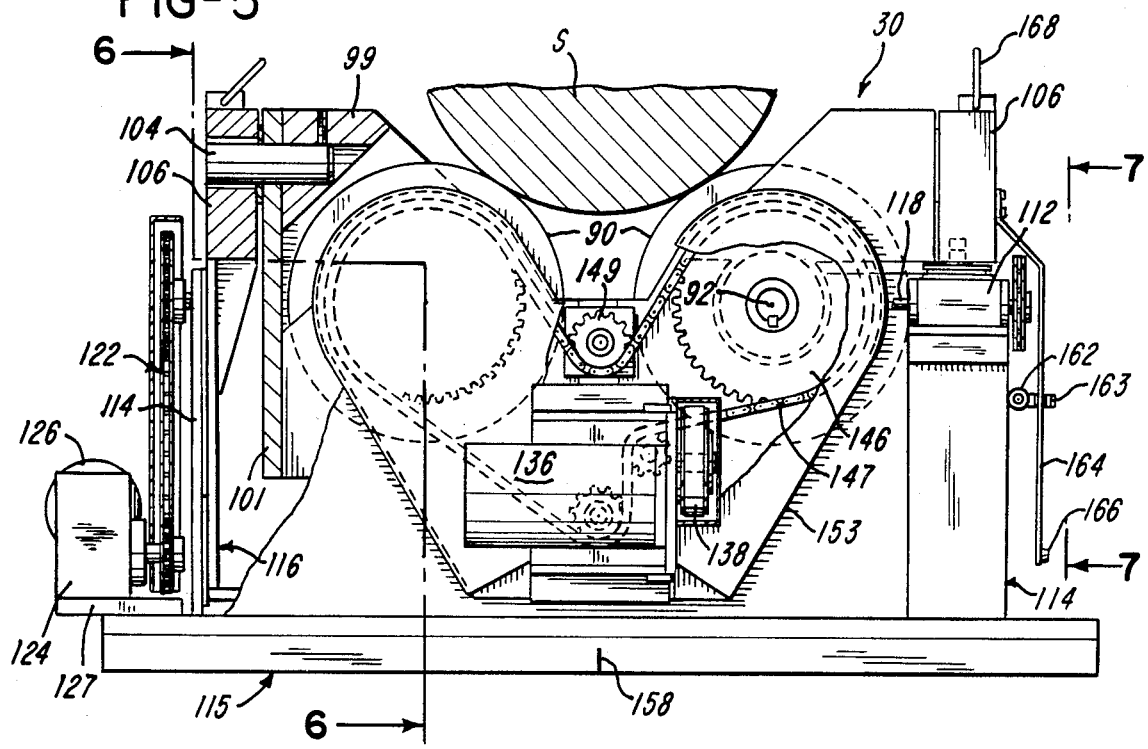
FIG. 5 is a part elevation and part vertical section of the workpiece support and drive unit, taken generally on the line 5—5 of FIG. 1.

FIG. 1 illustrates a workpiece in the form of an elongated shaft S of circular cross-section and including cylindrical bearing section 16, an end flange 17, intermediate connecting portions 18 and 19 and a tapered end portion 21. The shaft S is illustrates as an example of a substantially long and heavy workpiece which can be supported, rotated and treated in accordance with the invention. The shaft S is a propeller drive shaft from a ship, and the tapered end portion 21 receives the screw propeller for the ship. After an extended period of time in use, the salt water corrodes portions of the shaft which receives the fluid seals, bearings and screw propeller, requiring that these portions of the shaft S be reconstructed or rebuilt. The rebuilding operation requires that portions of the shaft be turned and then rebuilt in diameter by a deposit welding operation after which the rebuilt welded portions are machined and/or ground to the desired diameter or configuration.

In accordance with the present invention, the workpiece or shaft S is supported by a set of workpiece support units 25, a tail stock unit 28 and a combined workpiece support and drive unit 30. As will be described later, the units 25 and 30 rotatably support the workpiece at longitudinally spaced intervals, and the unit 30 also drives or rotates the shaft at a preselected speed. A set of carriages 35 are supported above the units 25 and 30 by a pair of parallel spaced tracks 38 (FIG. 3) which extend horizontal or parallel to the axis of the workpiece S. The tracks 38 are rigidly connected by longitudinally spaced cross-braces 39 and by longitudinally spaced support brackets 42 mounted in a cantilevered manner on corresponding vertical columns 44 which may form part of the frame of the building enclosing the apparatus of the invention.

Each carriage 35 includes a horizontal plate 47 (FIG. 3) which carries antifriction roller bearings 48 retained within V-shaped rails forming part of the tracks 38. A set of arms 51 are supported by the plate 47 of each carriage 35 and support a vertical track 54 on which a carriage portion 56 is mounted for vertical movement by antifriction linear bearings 57. As also shown in FIGS. 2 and 3, the carriage portion 56 projects above the units 25 and 30 and above the workpiece S.

A horizontal cross slide 59 is mounted on the carriage portion 56 and supports a plate 62 for horizontal movement or adjustment relative to the carriage portion 56. A workpiece treating device in the form of a welding head 64, is mounted on a plate 62 for vertical movement in response to actuation of a servo-controlled motor 66. The welding head 64 receives a continuously fed welding wire W from a wire supply coil C and a wire feeder 68 supported by the carriage portion 56. The operation of the welding head 64 and the wire feeder 68 is controlled from a control box 71 (FIG. 3) supported by an arm 72 secured to the vertical track 54 of the carriage 35.

Each of the carriages 35 is moved along the tracks 38 by operation of a DC servo-controlled motor 76 (FIG. 4) which drives a gear reducer 77 having an output drive pinion 79 engaging a linear gear or rack 81 extending the length of the tracks 38. A knob 84 (FIG. 4) provides for quickly disconnecting the drive engagement of the pinion 79 and rack 81 so that the carriage 35 may be manually moved along the tracks 38. The carriage portion 56 is moved vertically on the slide 57 by actuation of a D.C. motor 85. The motor drives a vertical screw 86 through a gear reducer 87, and the carriage portion 56 carries a nut 88 which receives the screw 86. A controller switch 89 is mounted on the cross slide plate 62 and senses vertical movement of the welding head 64. If movement of the head 64 exceeds predetermined limits, the switch automatically actuates the motor 85 to move or adjust the carriage portion 56. Thus the motor 66 provides for fine vertical adjustment of the welding head, and the motor 85 provides for course adjustment. An electrical circuit within the control box 71 senses the current within the welding head 64 and automatically controls the motor 66 so that a uniform weld is deposited on the workpiece S. Electrical power is supplied to the carriages 35 by a flexible power track T supported by the brackets 42.

Figure 7:
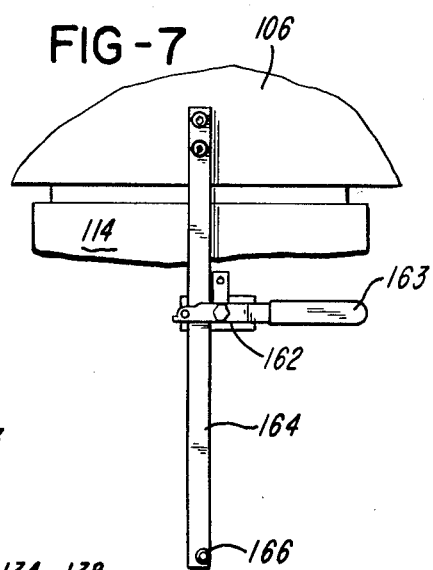
FIG. 7 is a fragmentary elevational view taken generally on the line 7—7 of FIG. 5.
Figure 6:
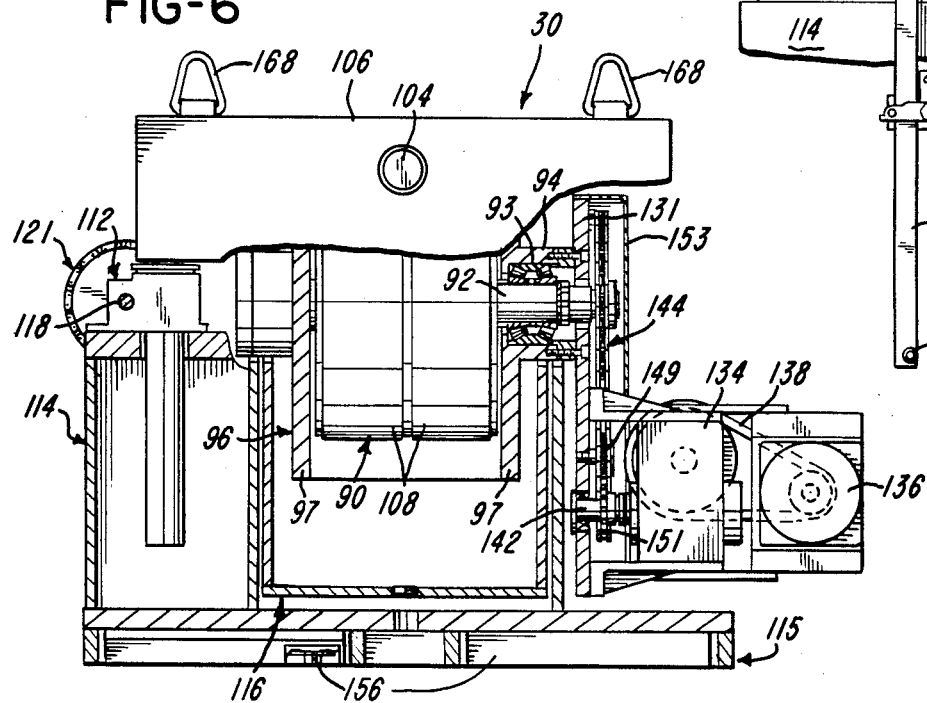
FIG. 6 is a fragmentary section of the workpiece support and drive unit taken generally on the lines 6—6 of FIG. 5.

Referring to FIGS. 5-7, the workpiece support and drive unit 30 includes a pair of cradle rolls 90 mounted on parallel spaced shafts 92 each supported by a pair of anti-friction bearings 93 confined within outwardly projecting tubular portions 94 of a rectangular box-like frame 96. The frame also includes parallel spaced vertical end plates 97 rigidly connected by a pair of trunnion members 99 (FIG. 5) and parallel spaced side plates 101. A pair of aligned trunnions or stub shafts 104 project outwardly from the trunnion members 99 and are rotatably supported by corresponding trunnion support blocks 106. Thus the cradle rolls 90 and their supporting frame 96 may pivot as a unit by a small angular degree on the axis of the shafts 104. As shown in FIG. 5, this axis is located substantially above a plane defined by the axes of the cradle rolls 90 so that the frame 96 and cradle rolls 90 are suspended in pendulum-like manner. Each of the cradle rolls 90 carries a pair of bands or layers 108 (FIG. 6) of resilient or rubber material to provide high friction engagement with the workpiece S supported by the cradle rolls 90.

A pair of power driven mechanical screw jacks 112 (FIG. 6) support opposite ends of each trunnion support block 106, and each jack 112 is supported by a fabricated box-like frame or pedestal 114 mounted on a corresponding corner portion of a rectangular fabricated base 115. A rectangular fabricated container or enclosure 116 is supported by the corner pedestals 114 and encloses the lower portions of the frame 96 and cradle rolls 90. Each pair of screw jacks 112 is driven by a common cross shaft 118, and the shafts 118 for both pairs of jacks 112 are connected by a chain drive 121 (FIG. 6) so that all four corner jacks 112 operate in unison. One of the cross shafts 118 projects outwardly from the corresponding frame 114 and is driven by a chain drive 122 (FIG. 5) extending from the output shaft of a gear reducer 124 driven by a reversible air motor 126. The gear reducer 124 and motor 126 are supported by a plate 127 (FIG. 5) secured to the base 115. Thus operation of the air motor 126 in opposite directions is effective to actuate all of the screw jacks 112 simultaneously for raising or lowering the pivoted supported frame 101 and the enclosed cradle rolls 90 within the enclosure 116.

As shown in FIG. 6, a vertical plate 131 is secured to the outer end of the right bearing retaining member 94 and supports a gear reducer 134 having an input shaft driven by a reversible and variable speed servo-controlled DC motor 136 through a gear belt drive 138. The gear reducer 134 has an output shaft 142 which drives both cradle roll shafts 92 through an endless chain drive 144. The chain drive 144 includes a pair of sprockets 146 mounted on the cradle roll shafts 92, an endless roller chain 147, a pair of idler sprockets 149 and a drive sprocket 151 mounted on the output shaft 142 of the gear reducer 134. A cover 153 is mounted on the plate 131 and encloses the chain drive 144. As apparent from FIG. 6, the drive system for the cradle rolls 90, including the gear reducer 134 and motor 136, is located outboard of the enclosure 116 and is supported for slight tilting movement with the frame 96 and cradle rolls 90 on the axis of the trunion shafts 104.

Each of the four corner portions of the base 115 is provided with an air lifting or flotation cell 156, preferably of the type manufactured by Air Barge Co. in Palos Verdes Peninsula, Calif. When compressed air is supplied simultaneously to the four air cells 156, the unit 30 is elevated and floats on a film of air flowing outwardly under the peripheral skirt of the base 115 to provide for conveniently moving the unit 30 across a concrete floor surface. As shown in FIG. 5, a pair of indicating marks 158 are placed on opposite sides of the base 115 on the center plane of the unit 30. The marks 158 provide for conveniently locating and positioning the unit in alignment with the support units 25 by locating the marks 158 directly over a straight line marked on the concrete floor surface.

Referring to FIG. 7, the main air supply line to the air motor 126 is controlled by a valve 162 actuated by rotating a handle 163. A vertical trip arm 164 is secured to one of the trunnion support blocks 106 and depends downwardly adjacent the valve handle 163. In the event the trunnion members 106 are elevated above a predetermined limit by the screw jacks 112, a stud 166 on the bottom of the arm 164 rotates the handle 163 to close the valve 162, thereby shutting off the air supply to the air motor 126 which drives the screw jacks 112. As also shown in FIGS. 5 and 6, a pair of pivotal lifting eyes 168 are secured to the upper surface of each trunnion block 106 and provide for transporting the unit 30 by an overhead crane.

FIGS. 8 and 9 illustrate the construction of each of the workpiece support units 25 and which is constructed very similar to the workpiece support and drive unit 30 but without the motor drive system for rotating the cradle rolls. Since the components of each workpiece support unit 25 are either identical or very similar to the components of the unit 30, the same reference numbers have been used to identify corresponding parts and components but with the addition of a prime mark. The primary difference between the unit 25 and the unit 30 is that the freely rotatable cradle rolls 90' of the unit 25 are not as wide in an axial direction as the cradle rolls 90 and do not have an outer resilient layer or band 108 as does each of the cradle rolls 90. The outer surface of each of the steel cradle rolls 90' firmly contacts the surface of the steel workpiece S, and the work-piece is electrically grounded through the cradle rolls 90' by a grounding connector 172 threaded into one of the trunnion members 99'.

Referring to FIG. 9, it has been found desirable to cool the cradle rolls 90' so that they do not overheat by the transfer of heat from the workpiece or shaft S being welded by the welding head 64. For cooling the cradle rolls 90', the lower portions of the cradle rolls project with the frame 96' into a supply of water enclosed within the container 116' and maintained at a level L. As described above in connection with the workpiece support and drive unit 30, the elevation of the cradle rolls 90' may be changed or precisely adjusted by simultaneously operating the screw jacks 112' through the endless chain 122', gear reducer 127' and reversible air motor 126'.

Referring to FIGS. 1 and 10, the trail stock unit 28 positions or locates the end of the workpiece or shaft S and cooperates with the support units 25 and 30 to prevent axial movement of the workpiece. The unit 28 includes a fabricated steel base 175 which may carry a set of air cells 156 to facilitate movement of the unit or the unit may be permanently bolted directly to the floor surface. The base 175 supports a vertical slide member 178 having an H-shape cross-sectional configuration and supporting a tubular head member 182. Another mechanical screw jack 112 is mounted on the base 175 and has a screw connected to the head member 182 for elevating the head member 182 and the slide member 178 in response to manual rotation of the input shaft 184 of the screw jack.

A spindle 186 is rotatably supported within the head member 182 by a pair of anti-friction bearings 187, and the spindle 186 supports a removable tapered center element 192 having an conical tip 183 adapted to engage the end of the workpiece or shaft S on its axis of rotation. A shaft 194 extends from the opposite end of the spindle 186 and drives an electronic tachometer or signal generator 196. The signal generator 196 senses the rotation of the spindle 186 and the workpiece S and electrically controls the D.C. motor 76 (FIG. 4) for moving each carriage 35 along the horizontal tracks 38. Thus when a weld is being applied to the tapered portion 21 of the workpiece S, the horizontal movement of the welding head 64 is precisely controlled to deposit a uniform welded layer on the tapered portion 41.

While not apparent from FIG. 1, the cradle rolls of the workpiece support units 25 and 30 are adjusted so that the left end of the workpiece S is slightly higher, for example, one inch, than the right end of the workpiece. Thus the axis of the workpiece is disposed on a slight incline to assure that the end surface of the workpiece is held in continuous contact with the center element 192 of the tail stock unit 28 and the workpiece does not shift axially. The pivot support of the cradle rolls and the adjustable elevation of the cradle rolls of each of the units 25 and 30 provide for conveniently and quickly positioning the workpiece S with its axis on a slight incline. In addition, the pivot supports of each pair of cradle rolls on the axis of the trunnion shaft S 104 or 104', assures uniform pressure support of the workpiece S by the cradle rolls. The vertical adjustment and positioning of the cradle rolls of each unit by the power driven screw jacks, 112 or 112' and the flotation support of each unit also provide for quickly accommodating workpieces of different lengths and/or diameters.

While the form of apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for rotatably supporting an elongated generally cylindrical workpiece having substantial weight, said apparatus comprising a pair of parallel spaced cradle rolls defining a nest for receiving and supporting the workpiece, a frame receiving said rolls, means mounted on said frame and supporting said rolls for rotation on their axes, a set of frame support members spaced with said frame therebetween, shaft means supported by said support members and supporting said frame and said cradle rolls for pivotal movement as a unit on an axis extending transversely to the axes of said rolls, a base member adapted to rest on a floor surface, a plurality of jacks mounted on said base member and supporting said frame support members, means for operating said jacks for raising or lowering said frame support members to position the workpiece at a precise elevation with said cradle rolls, and said base member and said jacks being spaced from said frame to provide for tilting movement of said unit including said frame and said cradle rolls.

2. Apparatus as defined in claim 1 and including a motor operated drive system connected to drive said cradle rolls simultaneously, and means connected to said frame and supporting said drive system for tilting movement with said unit.

3. Apparatus as defined in claim 2 wherein said drive system comprises a variable speed electric motor connected to a gear reducer, an endless chain drive connecting said gear reducer to corresponding shafts supporting said cradle rolls, and a bracket secured to said frame for pivotal movement therewith and supporting said motor and said gear reducer.

4. Apparatus as defined in claim 1 wherein each of said frame support members is elongated, said jacks comprise a pair of mechanical screw jacks engaging each said frame support member with said shaft means therebetween, and power operated means for actuating said jacks for both said frame support members simultaneously for precisely changing the elevation of said cradle rolls.

5. Apparatus as defined in claim 1 wherein said base member comprises a container enclosing portions of said frame and said rolls, and said container including means for retaining a supply of liquid for contact with said rolls to prevent overheating of said rolls by a heated workpiece.

6. Apparatus as defined in claim 1 and including a plurality of air inflatable cells mounted on said base member and providing for air flotation support of said apparatus to facilitate moving and precisely positioning said apparatus on the floor surface.

7. Apparatus as defined in claim 1 wherein said jacks comprise mechanical screw jacks, said means for operating said jacks include an endless drive member driven by a motor and gear reducer unit, and means for stopping said motor when said frame support members are elevated to a predetermined upper limit.

8. Apparatus as defined in claim 1 wherein said pivot axis for said unit of said frame and said cradle rolls is disposed substantially above a plane defined by the axes of said cradle rolls.

9. Apparatus as defiined in claim 1 wherein each of said cradle rolls comprises a cylindrical metal roll, a layer of resilient material extending circumferentially around said metal roll, and power operated means for driving at least one of said cradle rolls.

10. Apparatus as defined in claim 1 in combination with a horizontally extending elongated track, means supporting said track above said cradle rolls and in laterally offset parallel relation to said rolls, a carriage mounted on said track for longitudinal movement and including a portion projecting horizontally and cantileveredly above said rolls, means mounted on said carriage portion for treating the workpiece, and power operated means for moving said carriage longitudinally along said track.

11. Apparatus as defined in claim 10 and including first power operated means for moving said treating means vertically relative to said carriage portion, second power operated means for moving said carriage portion vertically relative to said track, and means for moving said second power operated means in response to movement of said first power operated means.

12. Apparatus as defined in claim 11 wherein said means for treating the workpiece comprise an electric welding head, and means supported by said carriage portion for feeding a supply of welding wire to said welding head.

13. Apparatus as defined in claim 1 in combination with a tailstock assembly including a rotatably supported spindle, a center tool element supported by said spindle and adapted to engage the end of the workpiece, means for moving said spindle vertically when the elevation of said cradle rolls is changed, and signal generator means connected to sense the rotation of said spindle and the workpiece.

14. Apparatus as defined in claim 13 wherein said tailstock assembly includes a head portion supporting said spindle for rotation, and said means for moving said spindle vertically comprise a mechanical screw jack supporting said head portion.

15. Apparatus for rotatably supporting an elongated generally cylindrical workpiece having substantial weight, said apparatus comprising a set of axially spaced shaft support units, each said unit including a pair of parallel spaced cradle rolls defining a nest for receiving and supporting the workpiece, a frame receiving said rolls, means mounted on said frame and supporting said rolls for rotation on their axes, a set of trunnion members spaced with said frame therebetween, shaft means supported by said trunnion members and supporting said frame and said cradle rolls for pivotal movement as a unit on an axis extending transversely to the axes of said rolls, each said unit further including a base member adapted to rest on a floor surface, a plurality of mechanical screw jacks mounted on said base member and supporting said trunnion members, means for operating said jack simultaneously for raising or lowering said trunnion members to position the workpiece at a precise elevation with said cradle rolls, and said base member and said jacks being spaced from said frame to provide for tilting movement of said unit including said frame and said cradle rolls.

16. Apparatus as defined in claim 15 wherein one of said units includes a motor operated drive system connected to drive said cradle rolls simultaneously.

17. Apparatus as defined in claim 15 wherein each said unit includes a plurality of air inflatable cells mounted on said base member of said unit and providing for air flotation support of said unit to facilitate moving and precisely positioning said unit on the floor surface.

18. Apparatus as defined in claim 15 in combination with a horizontally extending elongated track, means supporting said track is laterally offset parallel relation to said units, a carriage mounted on said track for longitudinal movement and including a portion projecting horizontally and cantileveredly above said units, means mounted on said carriage portion for treating the workpiece, and power operated means for moving said carriage longitudinally along said track.

19. Apparatus as defined in claim 15 in combination with a tailstock assembly aligned with said units and including a head member supporting a rotatable spindle, a center tool element supported by said spindle and adapted to engage the end of the workpiece, and jack means for moving said head member vertically when the elevation of said cradle rolls of said units is changed.

20. Apparatus as defined in claim 15 wherein said cradle rolls of at least one said unit comprise cylindrical metal rolls, a layer of resilient material extending circumferentially around each said metal roll, and power operated means for driving at least one of said cradle rolls.

* * * * *